United States Patent [19]

Radovsky

[11] Patent Number: 5,798,594

[45] Date of Patent: Aug. 25, 1998

[54] BRUSHLESS SYNCHRONOUS ROTARY ELECTRICAL MACHINE

[76] Inventor: Alexander Radovsky, Eder 42A, 34752, Haifa, Israel

[21] Appl. No.: 823,671

[22] Filed: Mar. 24, 1997

[30] Foreign Application Priority Data

Aug. 5, 1996 [IL] Israel ........................ 119010

[51] Int. Cl.$^6$ ........................ H02K 1/00; H02K 3/00; H02K 21/00

[52] U.S. Cl. ........................ 310/180; 310/49 R; 310/112; 310/156; 310/165; 310/178; 310/261; 310/263

[58] Field of Search ........................ 310/49 R, 112, 310/156, 165, 178, 261, 263, 268, 180; 318/685, 696

[56] References Cited

U.S. PATENT DOCUMENTS

| | | | |
|---|---|---|---|
| 437,501 | 9/1890 | Mordey | 310/49 R |
| 469,281 | 2/1892 | Sohlman | 310/49 R |
| 606,863 | 7/1898 | Gutmann | 310/49 R |
| 3,392,294 | 7/1968 | Campbell | 310/49 R |
| 3,437,854 | 4/1969 | Oiso . | |
| 3,992,641 | 11/1976 | Heinrich et al. | 310/168 |
| 4,127,802 | 11/1978 | Johnson | 318/696 |
| 4,385,247 | 5/1983 | Satomi | 310/49 R |
| 4,496,868 | 1/1985 | Advolotkin et al. | 310/112 |
| 5,030,867 | 7/1991 | Yamada et al. | 310/156 |
| 5,047,680 | 9/1991 | Torok | 310/156 |
| 5,117,144 | 5/1992 | Torok | 310/269 |
| 5,334,899 | 8/1994 | Skybyk | 310/268 |
| 5,345,131 | 9/1994 | Torok | 310/181 |

*Primary Examiner*—Steven L. Stephan
*Assistant Examiner*—Elvin G. Enad
*Attorney, Agent, or Firm*—Mark M. Friedman

[57] ABSTRACT

A brushless synchronous rotary electrical machine comprises stationary stator and "rotor" windings. Only the rotor moves. The rotor winding is a stationary helical winding, concentric with the rotor shaft and attached to the stator armature. Variation in time of the magnetic field associated with the rotor is provided by one or more magnetically interactive (ferromagnetic or ferrimagnetic) projections from the rotor that sweep past the sides of the rotor winding as the shaft rotates. Because all windings are stationary, brushes and rings are not needed. The geometries of the rotor, of the stator windings, and of the magnetically interactive part of the stator armature are arranged so that the entire length of the wire in the windings participates in the generation of AC current (in a generator) or torque (in a motor), and so that loss of power to eddy currents is minimized. In preferred embodiments of the machine as a generator, the geometries of the rotor and of the stator armature are chosen to ensure that the magnetic field through the AC winding changes sign cyclically.

23 Claims, 13 Drawing Sheets

BRUSHLESS SYNCHRONOUS ROTARY ELECTRICAL MACHINE

FIELD AND BACKGROUND OF THE INVENTION

The present invention relates to electrical machinery and, more particularly, to brushless synchronous electrical generators and motors.

FIGS. 1A, 1B and 1C illustrate the terms used herein to define the geometries of rotary machines and their electrical windings. FIG. 1A shows a right circular cylinder 11, and the corresponding radial, azimuthal, and axial directions. As used herein, a "toroidal" winding is a winding, around a cylinder or torus, that is always perpendicular to the axial direction, and a "poloidal" winding is a winding that is at least partly parallel to the axial direction. FIG. 1B shows a torus 12 partially wound with a toroidal winding 13. FIG. 1C shows a torus 14 partially wound with a poloidal winding 15.

In a conventional synchronous AC electric generator, the rotor winding is connected to a DC current source via rings and brushes. As the rotor is rotated, the magnetic field created by the DC current rotates along with the rotor, inducing an AC electromagnetic force (EMF) in the stator winding. The same design is commonly used for synchronous electric motors: AC current in the stator winding creates a rotating magnetic field that interacts with the rotor's direct magnetic field, causing the rotor armature to rotate.

This design suffers from several inefficiencies. First, the rings and the brushes wear out over time and must be replaced. Second, parts of the stator winding, called "winding ends", protrude beyond the armature. These winding ends do not participate in the generation of electrical current in a generator, or in the generation of torque in a motor; but, unless the windings are made of superconductors, the winding ends contribute to resistance losses. In addition, the associated magnetic fields create eddy currents in electrical conductors outside of the armatures. These eddy currents are an additional drain on the power output of a generator or the power input of a motor.

The reason that rings and brushes are needed in the conventional synchronous machine design is to provide electrical power from a stationary DC current source to a moving rotor winding. There also are brushless designs, one of which, a synchronous induction machine, is illustrated schematically in cross-section in FIG. 2. An axially slotted cylinder 32, made of a ferromagnetic material such as iron, is rigidly mounted on a shaft 30, and rotates within a stationary armature 34. Armature 34 is geometrically in the form of an annulus, with a cylindrical central hole to accommodate slotted cylinder 32, and an interior equatorial slot to accommodate an annular, toroidally wound coil 36. In cross section, armature 34 looks like two opposed U's, as shown. What appear as the arms of the U's are actually two toroidal disks. A set 38 of windings are wound poloidally in slots on the inner periphery of these two disks. Conventionally there are three interleaved windings in set 38, making the synchronous induction machine of FIG. 2 a three-phase machine.

A DC current is supplied to toroidal coil 36, creating a magnetic field around slotted cylinder 32 and windings 38. Because cylinder 32 is slotted and ferromagnetic, as cylinder 32 rotates, the geometry of the magnetic field changes, inducing an AC EMF in poloidal windings 38. Conversely, an AC current introduced to poloidal windings 38 generates a time-varying magnetic field that applies a torque to cylinder 32, causing cylinder 32 to rotate.

The design of FIG. 2 eliminates the need for rings and brushes, but still has the inefficiencies associated with having winding ends that protrude outside the effective zone of electromagnetic induction. In addition, this design is inherently wasteful of space. Coils 36 and 38 must be separated spatially (as shown schematically in FIG. 2) to minimize eddy current losses.

There thus is a widely recognized need for, and it would be highly advantageous to have, an electrical machine (generator or motor) with only stationary windings, arranged geometrically for maximum efficiency.

SUMMARY OF THE INVENTION

According to the present invention there is provided an electrical machine including: (a) a stator armature including a number of magnetically interactive axial bars; (b) a substantially toroidal annular winding, rigidly attached to the stator armature and having two lateral sides; (c) a rotor including: (i) a shaft concentric with and extending axially through the annular winding and free to rotate therewithin, and (ii) a magnetically interactive rotor member, rigidly attached to the shaft, and including two projections extending radially outward from the shaft, each of the projections sweeping past the axial bars and past at least a portion of one of the lateral sides of the winding as the shaft rotates.

According to the present invention there is provided an electrical machine including: (a) a stator armature, including two sets of magnetically active L-shaped poles, each of the L-shaped poles having a radial leg and an axial leg meeting at an elbow, the radial leg extending radially outward from the elbow, the axial leg extending axially from the elbow, the L-shaped poles of a first of the two sets being positioned azimuthally around the armature at substantially equal angular spacings, the L-shaped poles of a second of the two sets, equal in number to the L-shaped poles of the first set, also being positioned azimuthally around the armature at the substantially equal angular spacings, interleaved azimuthally with the L-shaped poles of the first set, with the axial legs of the L-shaped poles of the first set pointing axially opposite to the axial legs of the L-shaped poles of the second set; (b) a substantially toroidal annular winding, rigidly attached to the stator armature and having two lateral sides; and (c) a rotor including: (i) a shaft concentric with and extending axially through the annular winding and free to rotate therewithin, and (ii) a magnetically interactive rotor member, rigidly attached to the shaft, and including two projections extending radially outward from the shaft, each of the projections sweeping past at least a portion of one of the lateral sides of the winding as the shaft rotates.

According to the present invention there is provided an electrical machine including: (a) a stator armature including a number of magnetically interactive stator cores; (b) a substantially toroidal annular inner winding, rigidly attached to the stator armature and having two lateral sides, each of the stator cores extending radially outward from the inner winding, the stator cores being positioned azimuthally around the inner winding at substantially equal angular separations; and (c) a rotor including: (i) a shaft concentric with and extending axially through the inner winding and free to rotate therewithin, and (ii) a magnetically interactive rotor member, rigidly attached to the shaft, and including two projections extending radially outward from the shaft, each of the projections sweeping past at least a portion of one of the lateral sides of the winding as the shaft rotates.

According to the present invention there is provided an electrical machine including: (a) a stator armature including a magnetically interactive ring; (b) a substantially toroidal annular inner winding, rigidly attached to the stator armature substantially concentrically with the ring and having two lateral sides; (c) a rotor including: (i) a shaft concentric with and extending axially through the inner winding and free to rotate therewithin, and (ii) a magnetically interactive rotor member, rigidly attached to the shaft, and including two projections extending radially outward from the shaft, each of the projections sweeping past at least a portion of one of the lateral sides of the winding and past at least a portion of the ring as the shaft rotates; and (d) at least one stator winding, wound poloidally around the ring.

According to the present invention there is provided an electrical machine including: (a) a stator armature; (b) a substantially toroidal annular inner winding, rigidly attached to the stator armature, and having two lateral sides; and (c) a rotor including: (i) a shaft concentric with and extending axially through the inner winding and free to rotate therewithin, and (ii) a magnetically interactive rotor member, rigidly attached to the shaft, and including two projections extending radially outward from the shaft, each of the projections sweeping past at least a portion of one of the lateral sides of the winding as the shaft rotates, at least one of the projections including a plurality of substantially parallel sheets of a magnetically interactive material separated by at least one insulating material.

As used herein, the term "magnetically interactive material" means a material that interacts strongly with a magnetic field, for example a ferromagnetic material or a ferrimagnetic material. Parts of the present invention that are made of, or include, a magnetically interactive material are herein called "magnetically interactive". The preferred magnetically interactive materials of the present invention are soft ferromagnetic materials such as magnetic steel.

The present invention is similar to the synchronous induction motor of FIG. 2, but the windings and armatures are arranged so that all, or almost all, of the length of the windings actively participate in the energy transformation process. One of the windings is wound around a shaft, with a gap between the shaft and the winding, so that the winding can remain stationary as the shaft rotates therewithin. A projection, made of a magnetically interactive material, is fixed to the shaft next to the winding. The shaft and the projection fixed thereto constitute a rotor. As the rotor rotates, the projection is swept past the winding. The radial extent of the projection varies azimuthally, so that the geometry of a magnetic field around the shaft changes as the shaft rotates, or conversely, a time-varying magnetic field near the shaft exerts a torque on the projection. Because of the intimate geometrical association of this winding with the rotor, it is referred to herein as the "inner" winding.

The inner winding, and one or more "stator" windings, are rigidly attached to a stator armature that surrounds the rotor. This rigid attachment may be indirect: for example, in one embodiment of the present invention, a stator winding is rigidly connected to the stator armature and a inner winding is rigidly connected to the stator winding. The stator armature is made at least in part of a magnetically interactive material, to help shape and concentrate the magnetic fields associated with the windings.

Thus, the present invention succeeds in providing a compact, efficient brushless electrical machine whose windings are fully exploited. The problems addressed herein also have been addressed by Török in U.S. Pat. No. 5,047,680.

Török's solution, however, requires the use of permanent magnets, and therefore is inherently limited to low power applications. In addition, Török's permanent magnets are mounted on his stator as circumferential rings that are mutually staggered, whereas his toothed rotor rings, which rotate within the rings of permanent magnets, are mutually aligned, so that when one rotor ring is aligned with the surrounding ring of permanent magnets, thereby being in a position of low reluctance, the other rotor rings are staggered with respect to the rings of permanent magnets that surround them, and are therefore in positions of high reluctance. This reduces the efficiency of Török's design.

A further advantage of the electrical machine of the present invention over the machine of the prior art is that the stator windings of the present invention require less insulation than the stator windings of the prior art. In a conventional synchronous AC generator, for example, the stator winding is inserted into slots in the stator armature, and must be insulated on all sides from the voltage difference (whatever the output of the generator is) between the winding and the armature. Stator windings of the present invention are wound either helically, or poloidally as illustrated in FIG. 1C, on the surfaces of the stator armatures, and so must be insulated from the output voltage difference of the generator only on the sides that face the stator armatures. The insulation between lengths of stator winding needs to withstand a much smaller voltage difference, and so may be much thinner than the insulation between the windings and the armature.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a brushless synchronous rotary electrical machine in which the armature and winding geometries are selected to maximize the interaction of the magnetic fields created by the windings. The present invention can be used to generate AC power, or to convert AC power to rotary motion, more efficiently than presently known electrical machines.

Figure 1A:
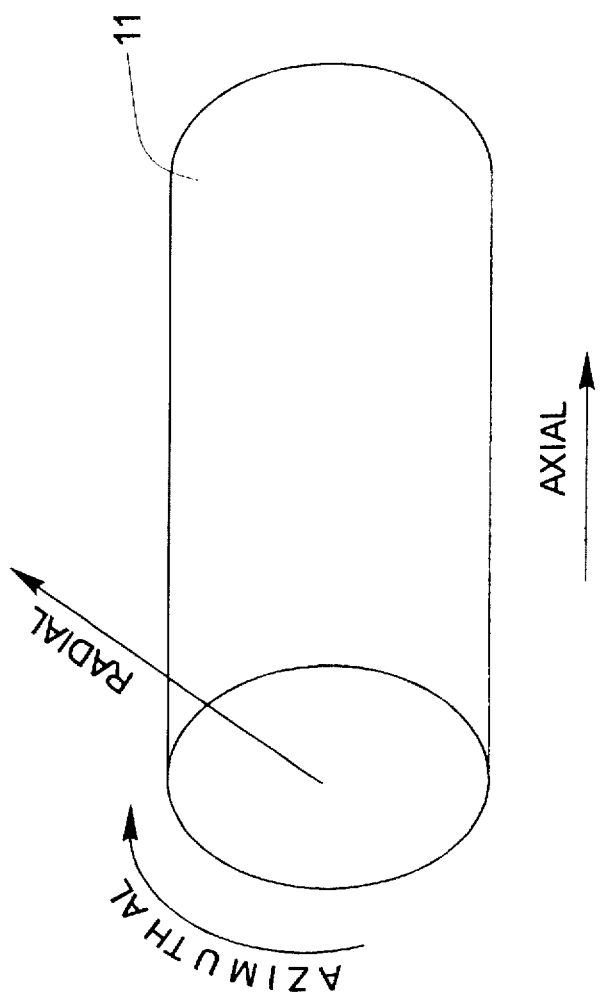
FIG. 1A (prior art) illustrates the definition of geometric terms used herein.
Figure 1B:
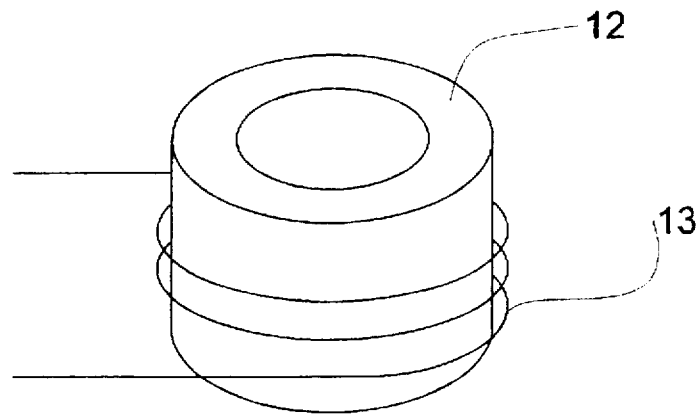
FIG. 1B (prior art) illustrates the definition of the term "toroidal" as used herein.
Figure 1C:
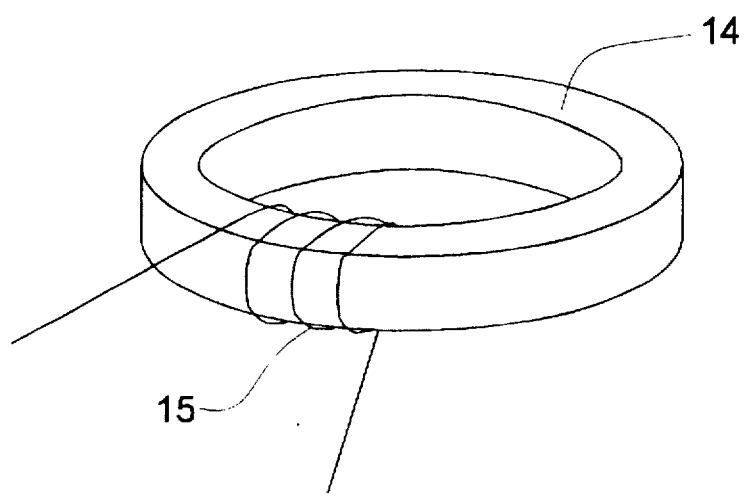
FIG. 1C (prior art) illustrates the definition of the term "poloidal" as used herein.
Figure 2:
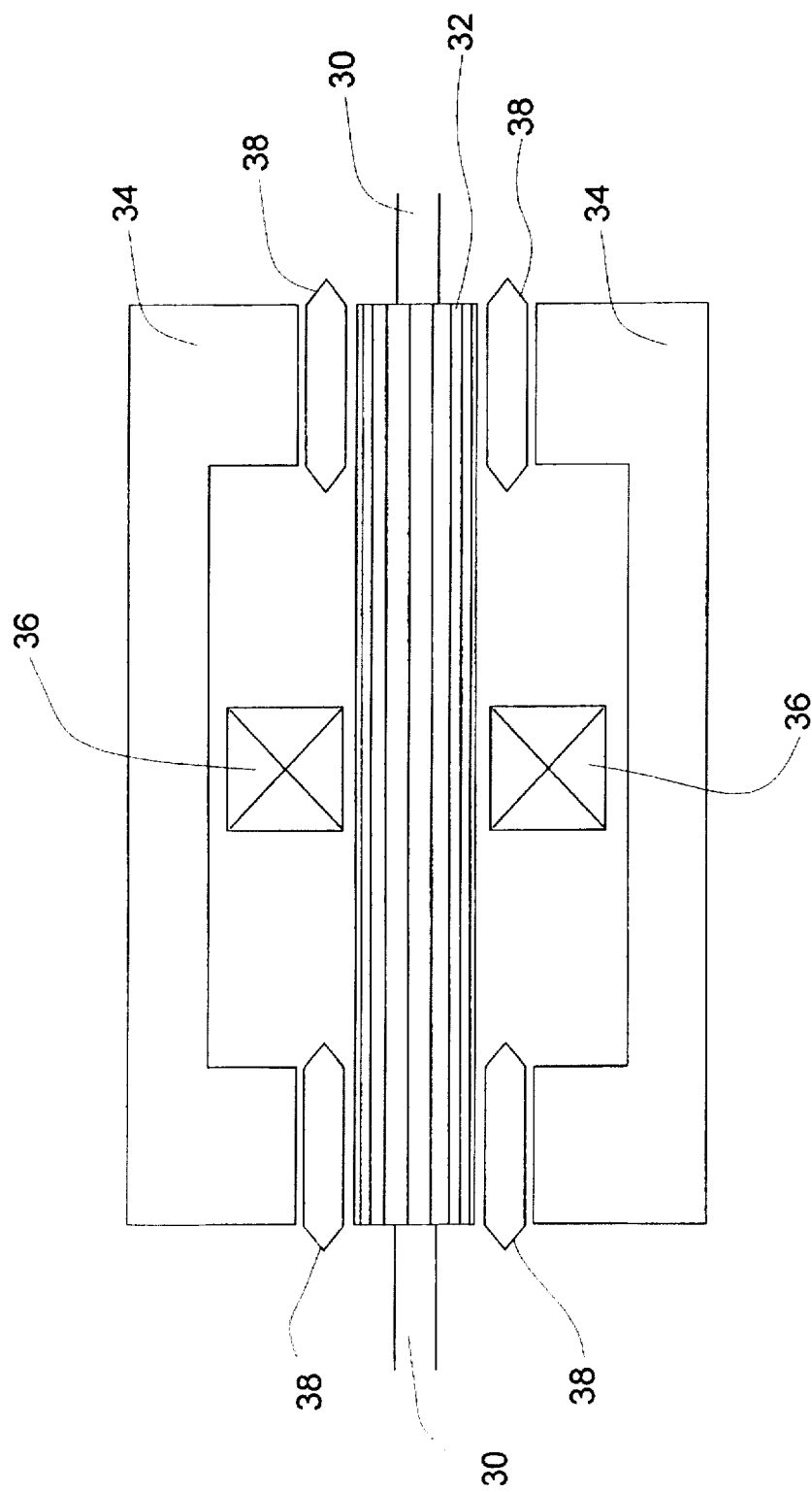
FIG. 2 (prior art) is a schematic cross-section of a synchronous induction machine.
Figure 3:
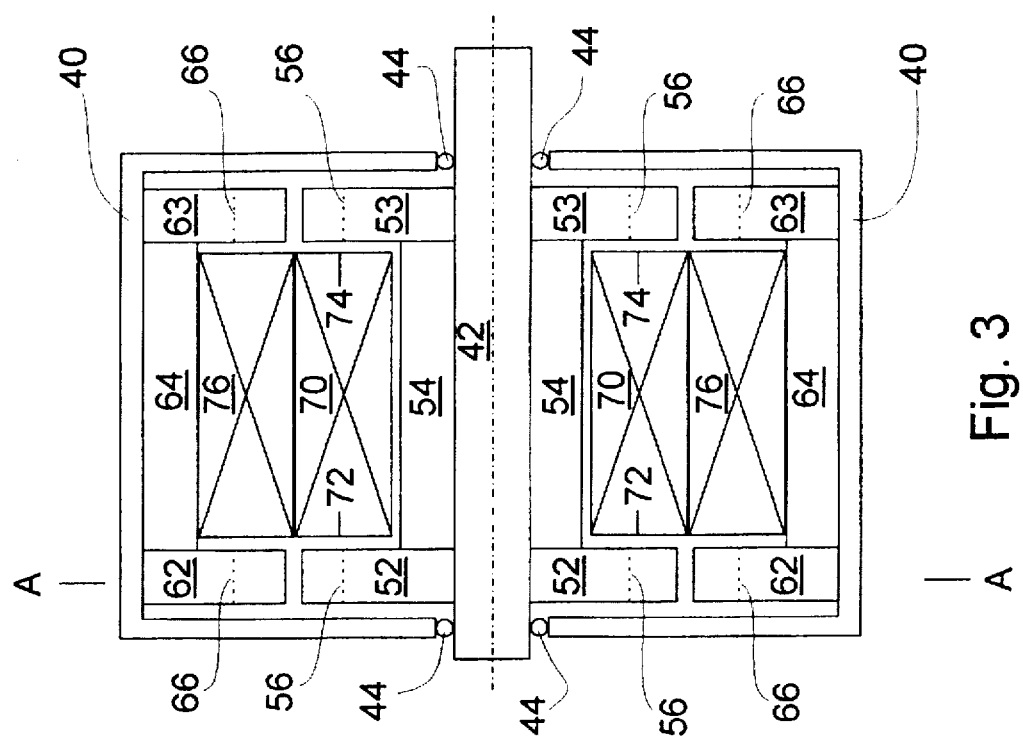
FIG. 3 is an axial cross-section through a first embodiment of the present invention.
Figure 4:
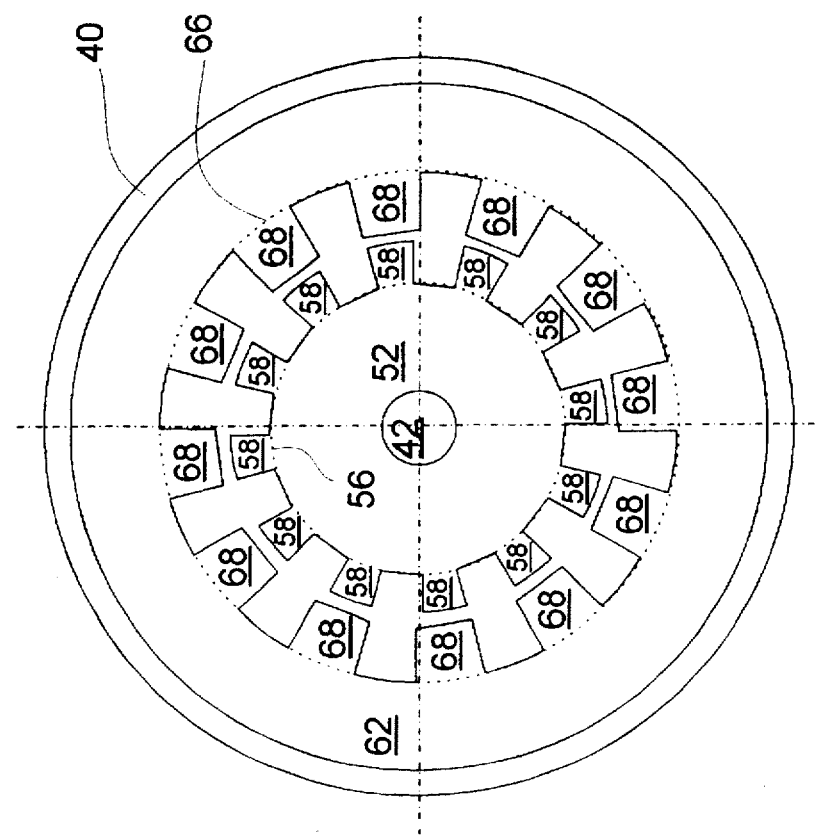
FIG. 4 is a transverse cross-section through the embodiment of FIG. 3.

Referring now to the drawings, FIG. 3 is an axial cross-sectional view of a relatively simple embodiment of the present invention, and FIG. 4 is a transverse cross-sectional view through the embodiment of FIG. 3 along line A—A. A cylindrical shaft 42 is mounted on bearings 44 within a housing 40. Shaft 42 is free to rotate within housing 42 on bearings 44. Rigidly attached to shaft 42 is a rotor armature that includes two outer annular disks 52 and 53, and an inner annular cylinder 54. The rotor armature is a spindle-shaped structure: the portions of outer disks 52 and 53 that project radially outward beyond inner cylinder 54 define between them an equatorial slot. Rigidly attached to the interior of housing 40, and complementary to the rotor armature, is a stator armature that includes two outer annular disks 62 and 63, and an inner annular cylinder 64. The portions of outer disks 62 and 63 that project radially inward beyond inner cylinder 64 define between them an equatorial slot opposite the equatorial slot of the rotor armature. The rotor armature and the stator armature are made of a magnetically interactive material.

Outer disk 52 has a perimeter 56, represented in FIGS. 3 and 4 by dotted lines. Outer disk 62 has an inner perimeter 66, also represented in FIGS. 3 and 4 by dotted lines. Teeth 58 of outer disk 52 project radially outward from perimeter 56. A like number of teeth 68 of outer disk 62 project radially inward from perimeter 66. Outer disks 53 and disk 63 have similar teeth projecting outward and inward, respectively, from the perimeter and inner perimeter, respectively, thereof.

An annular, toroidal stator winding 76 is rigidly attached to the inner perimeter of cylinder 64. An annular, toroidal inner winding 70, having two lateral sides 72 and 74, is rigidly attached to the inner perimeter of stator winding 76. As shaft 42 rotates on bearings 44, outer disk 52 sweeps past lateral side 72 of inner winding 70 and outer disk 53 sweeps past lateral side 74 of inner winding 70.

To use the device of FIGS. 3 and 4 as a generator, DC current is provided to stator winding 76, and shaft 42 is rotated by an external means. The magnetically interactive rotor and stator armatures concentrate the magnetic field created by the DC current. As teeth 58 move past teeth 68, the magnetic field is made to vary periodically, inducing an AC EMF in inner winding 70.

The device of FIGS. 3 and 4 is not useable as such as a motor, because it is too symmetrical. For example, whenever teeth 58 are exactly opposite teeth 68, and whenever teeth 58 are exactly in-between teeth 68, all forces are radial and no torque is applied to shaft 42. One way to establish the necessary asymmetry is to mount three units of the type shown in FIGS. 3 and 4 in tandem on shaft 42. The three units have their stator armature teeth aligned, but the rotor armature teeth of the second unit are shifted azimuthally with respect to the rotor armature teeth of the first unit by one-third of the tooth pitch (the angle spanned by a tooth and an adjacent slot), and the rotor armature teeth of the third unit are shifted azimuthally with respect to the rotor armature teeth of the second unit by one-third of the tooth pitch. If the stator and rotor armature outer disks all have a number P of teeth, then the tooth pitch is $2\pi/P$ radians, so the rotor armature teeth of the second unit are shifted by $2\pi/3P$ radians with respect to the rotor armature teeth of the first unit, and the rotor armature teeth of the third unit are shifted by $2\pi/3P$ radians with respect to the rotor armature teeth of the second unit. Furthermore, the AC current supplied to the inner winding of the second unit is one-third of a cycle out of phase with the AC current supplied to the inner winding of the first unit, and the AC current supplied to the inner winding of the third unit is one-third of a cycle out of phase with the AC current supplied to the inner winding of the second unit. The result is that the net magnetic interaction between teeth 58 and 68 is attractive as teeth 58 approach teeth 68 and repulsive as teeth 58 move away from teeth 68. The same effect also can be obtained using only two units with AC currents that are one-quarter of a cycle out of phase from each other. As the rotor teeth approach the stator teeth, the AC currents in the inner windings flow in a direction that creates an attraction between the teeth. As the rotor teeth move away from the stator teeth, the AC currents in the inner windings flow in a direction that creates a repulsion between the teeth.

The embodiment of FIGS. 3 and 4 is particularly useful as a high frequency generator, as a low speed motor, and as a stepping motor. In a stepping motor configuration with three units in tandem, for example, inner winding 70 and stator winding 76 of each unit are connected in series. Square pulses of DC current are supplied alternately to the first unit, the second unit, and the third unit. Whenever a unit receives a pulse, the rotor teeth 58 and stator teeth 68 of the unit move into alignment. Thus, each DC pulse causes common shaft 42 to rotate one angular step of one third of a tooth pitch. This stepping motor develops high torque for small angular steps, unlike the prior art stepping motors, which can deliver either high torque or small angular steps, but not both.

Figures 11, 12:
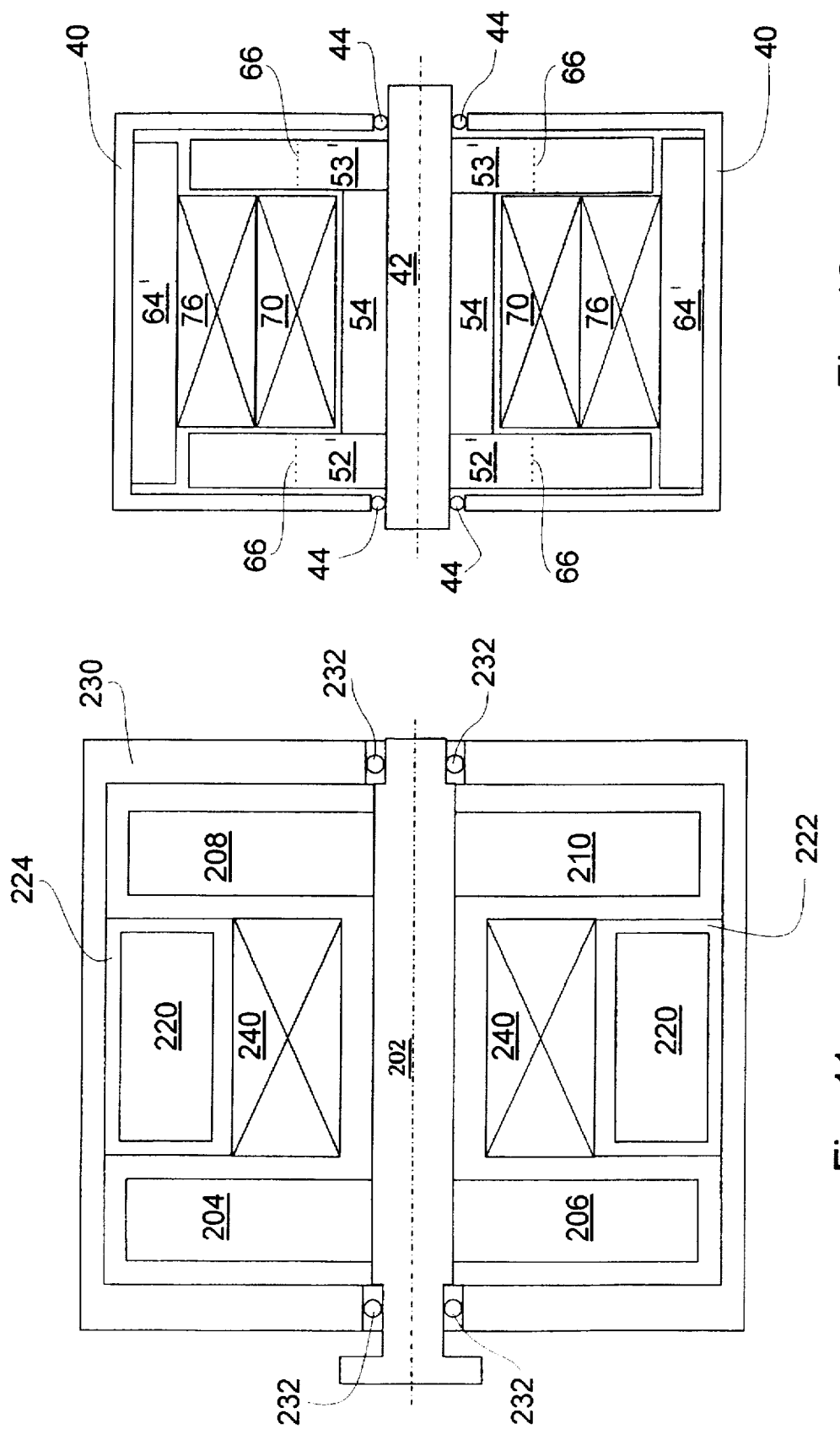
FIG. 11 is an axial cross section through the embodiment of FIG. 10.
FIG. 12 is an axial cross section through a variant of the embodiment of FIGS. 3 and 4.

FIG. 12 shows an axial cross-sectional view of a variant of the design of the embodiment of FIGS. 3 and 4, suitable for use as a generator. In this variant, disks 62, 63 and 64 of the stator armature are replaced by axial bars 64' that are made of a magnetically active material and that are disposed circumferentially around the inner periphery of housing 40. There are as many axial bars 64' as there are teeth on each of outer disks 52' and 53' of the rotor armature. Outer disks 52' and 53' extend radially outward into the space that is occupied by outer disks 62 and 63 in FIGS. 3 and 4.

Figure 13:
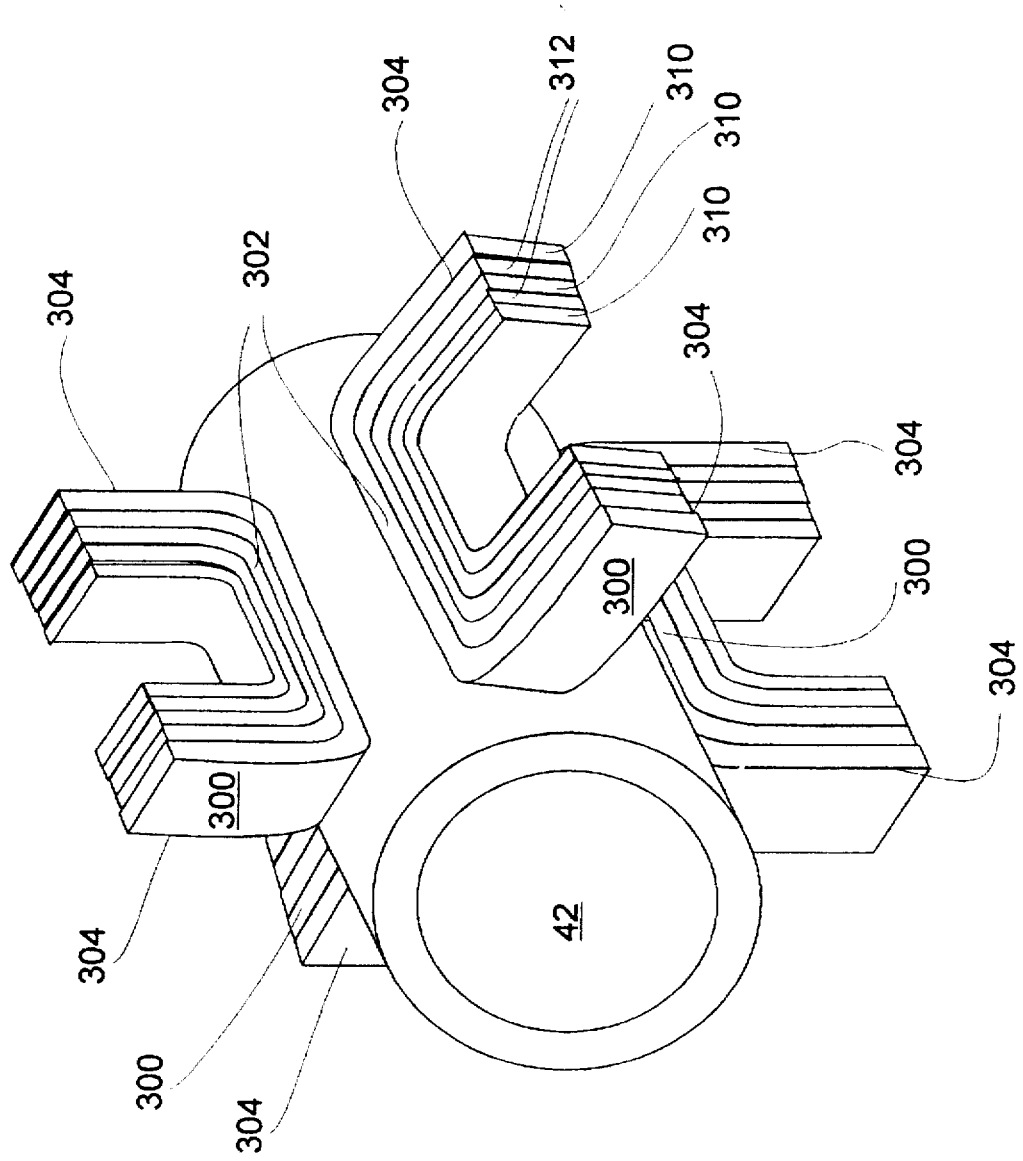
FIG. 13 is a perspective view of a variant of the rotor of the embodiment of FIGS. 3 and 4.

The magnetically interactive projections of the rotor of this embodiment need not be toothed disks. FIG. 13 is a perspective view of a variant of the rotor in which the projections are legs 304 of four C-cores 300 such as are used in transformers. C-cores 300 are attached to shaft 42 at the shanks 302 thereof, and legs 304 project radially away from shaft 42. One important aspect of the construction of C-cores 300 is that they are laminated structures, made of substantially parallel sheets 310 of a magnetically interactive metal, such as magnetic steel, separated by layers 312 of an insulator, such as epoxy glue. This laminated structure of alternating electrical conductors and electrical insulators suppresses the formation of power-wasting eddy currents. One way of fabricating laminated C-cores 300 is to apply epoxy glue to one side of a magnetic steel strip, roll up the strip, wait for the glue to set, and cut the rolled up strip longitudinally in half.

Figure 14:
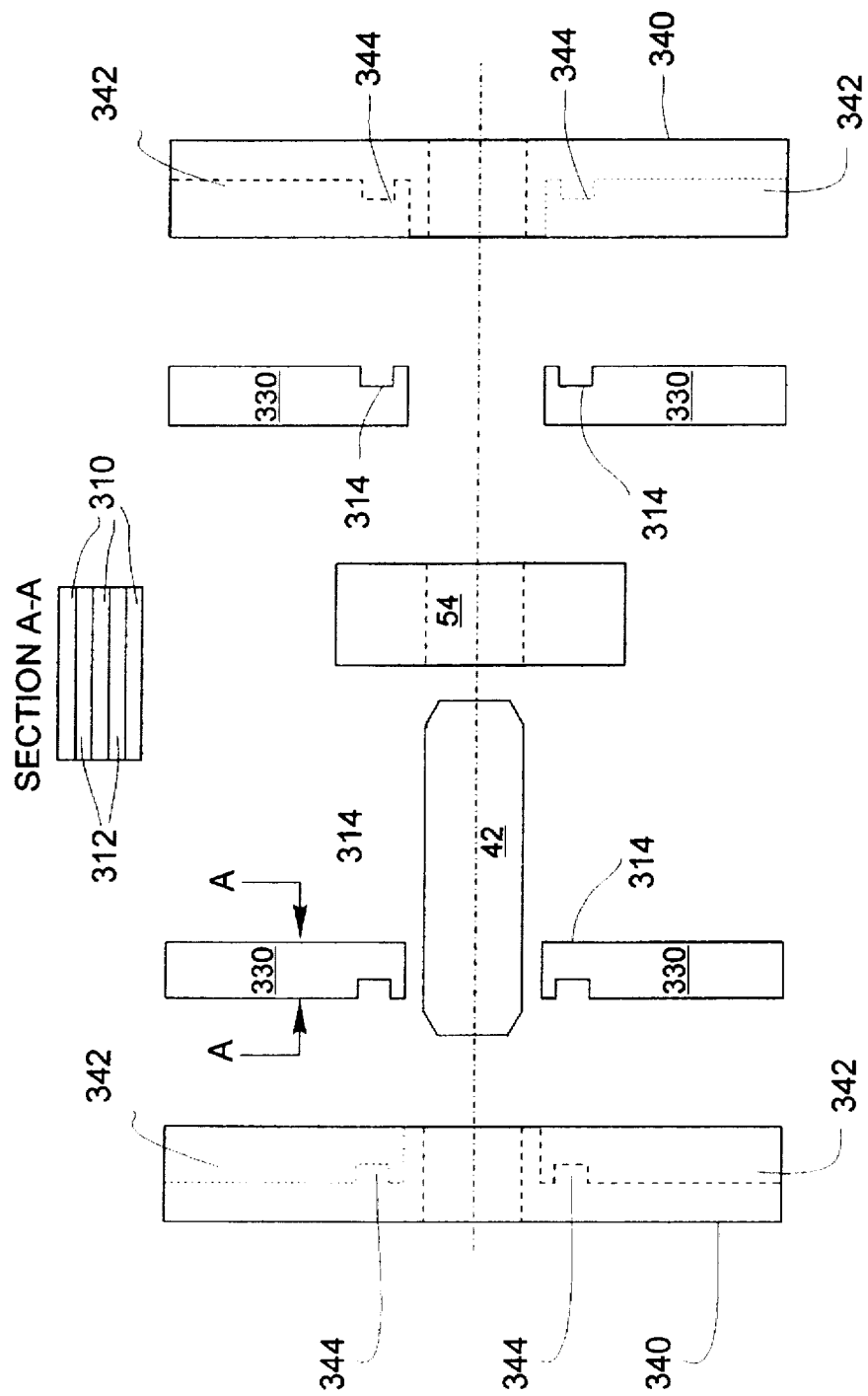
FIG. 14 is an exploded side view of another variant of the rotor of the embodiment of FIGS. 3 and 4.

FIG. 14 is an exploded side view of another variant of the rotor of this embodiment. To each end of shaft 42 is attached a disk 340 made of a magnetically noninteractive material. Each disk 340 is provided with radial slots 342 that accommodate radially projecting laminated fingers 330. Fingers 330 are made of alternating layers of magnetic steel 310 and epoxy glue 312, as shown in horizontal section A—A of upper left finger 330. Fingers 330 constitute the magnetically active projections of this variant of the rotor. Within slots 342 are ridges 344 that fit into grooves 314 on the backs of fingers 330. The mechanical function of disk 340 is to secure fingers 330 against centrifugal force, and to transfer torque from shaft 42 to fingers 330 (if the rotor is used in a generator) or from fingers 330 to shaft 42 (if the rotor is used in a motor).

Disks 340 may be made of an insulating material or of an electrically conductive but magnetically noninteractive material. If disks 340 are made of an electrically conductive material, then disks 340 are provided with radial slits, to suppress eddy currents. Like C-cores 300 and fingers 310, annular cylinder 54 preferably is laminated to suppress eddy currents. A wound and glued steel strip, similar to the intermediate in the production of C-cores 300, may be used as cylinder 54.

Figure 15:
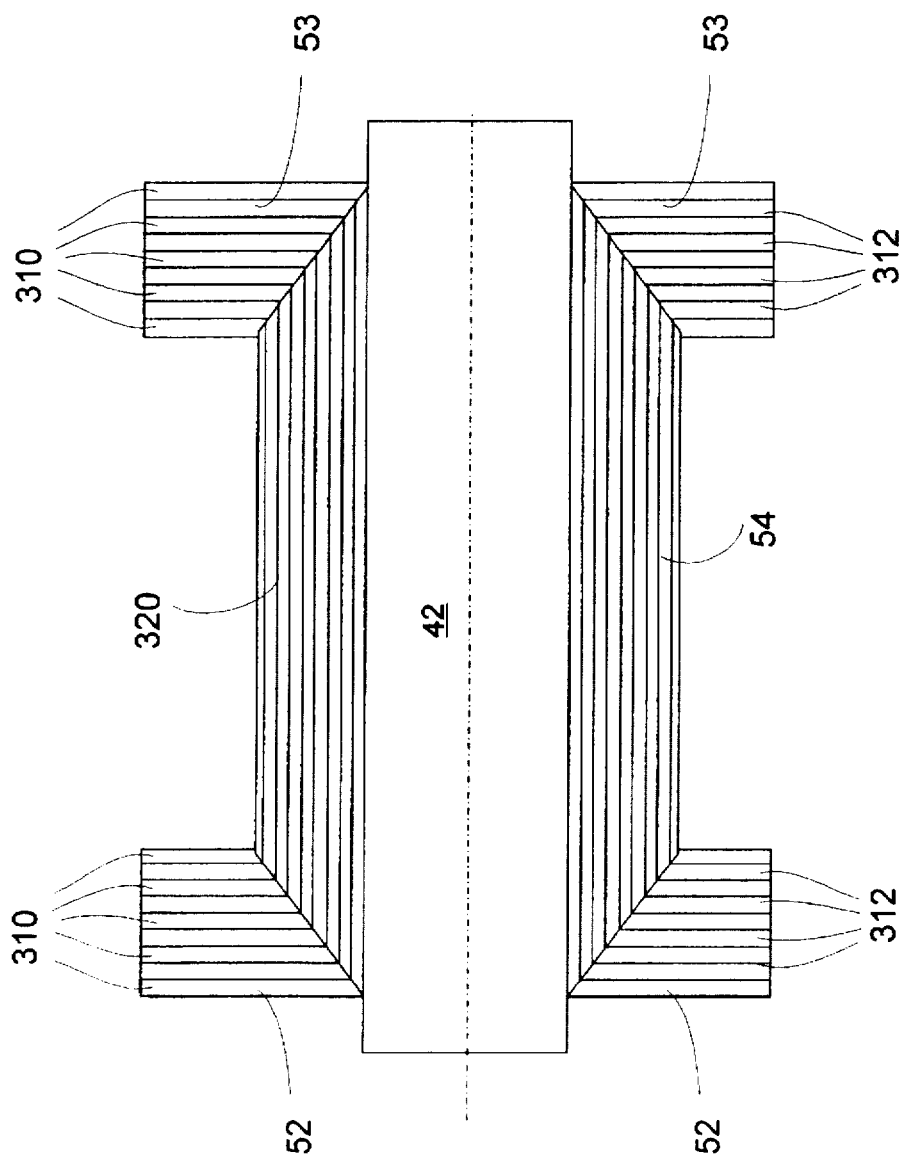
FIG. 15 is an axial cross section of the rotor of the embodiment of FIGS. 3 and 4 with laminated toothed disks.

A similar design may be used for toothed disks 52 and 53 of FIGS. 3 and 4. FIG. 15 is an axial cross section of the rotor of FIGS. 3 and 4 showing disks 52 and 53 as laminated structures of magnetic steel 310 and epoxy glue 312. Cylinder 54 is shown laminated as described above. Note that the ends of cylinder 54 are tapered, and disks 52 and 53 have conical central holes to accommodate the tapered ends of cylinder 54. Disks 52 and 53 are fabricated by stamping identical toothed disks from sheet steel, gluing the disks together using, for example, epoxy glue, and machining the central holes of the disks on a lathe. The ends of cylinder 54 may be tapered similarly. Alternatively, cylinder 54 may be fabricated by winding a trapezoidal steel strip; and disks 52 and 53 may be fabricated by stamping out toothed steel disks having central holes of successively increasing diameters, and gluing the disks together using epoxy glue.

Although the description above speaks of AC current flowing through winding 70 and DC current flowing through winding 76, it will be appreciated that the devices of FIGS. 3, 4 and 12 also may be used with DC current flowing through winding 70 and AC current flowing through winding 76. It also will be appreciated that outer disks 52, 53, 62 and 63 need not have teeth 58 and 68 all the way around perimeters 56 and 66, in motors such as torquers in which the angular range of the motion of shaft 42 is inherently limited to less than a full circle.

One drawback of the design of the embodiment of FIGS. 3 and 4 is that, in generator mode, less than half of the full range of magnetic flux created by the stator winding is used to create EMF in the inner winding. In other embodiments of the present invention, the geometries of the rotor and the stator are configured so that the magnetic field through the inner winding is fully exploited.

Figure 5:
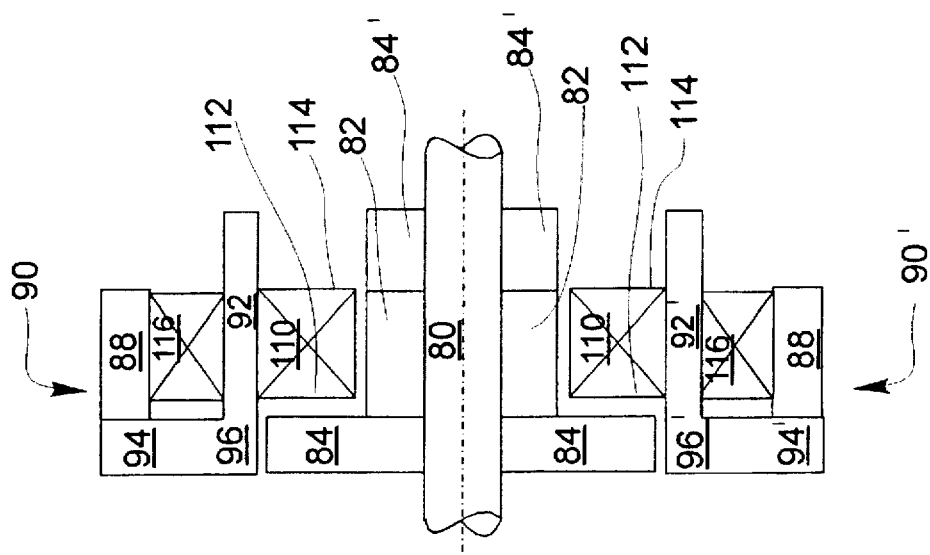
FIG. 5 is an axial cross-section through a second embodiment of the present invention.
Figure 6:
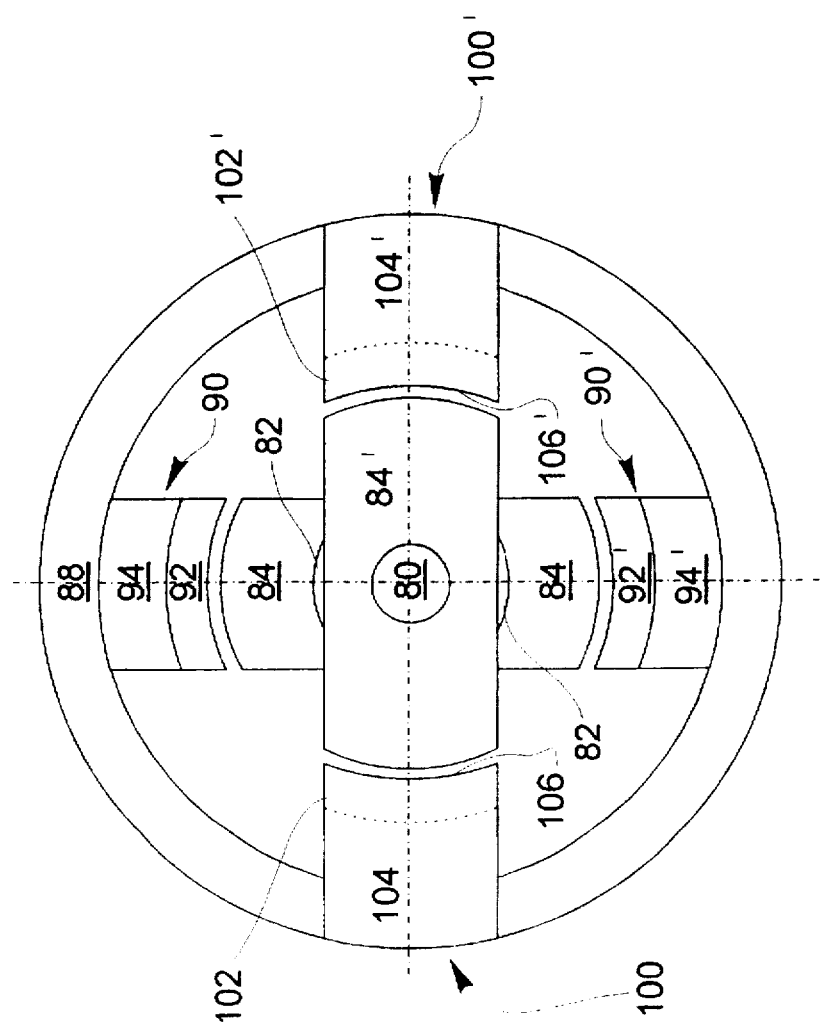
FIG. 6 is an end-on view of the embodiment of FIG. 5.

FIGS. 5 and 6 show one such design, the example of the design illustrated being a four pole machine. FIG. 5 is an axial cross-section through the embodiment. FIG. 6 is an end-on view of the embodiment. In both Figures, neither the housing nor the bearings are shown, for clarity. In FIG. 6, the windings are not shown either, also for clarity.

To a shaft 80 are rigidly attached two rectangular bars 84 and 84'. Bar 84' is mounted perpendicular to bar 84. Also rigidly attached to shaft 80 is an annular cylinder 82 connecting bars 84 and 84'. Bars 84 and 84' and cylinder 82 are made of magnetically interactive materials. Shaft 80, bars 84 and 84', and cylinder 82 together constitute the rotor of the embodiment of FIGS. 5 and 6.

The stator armature of the embodiment of FIGS. 5 and 6 is a circumferential ring 88 to which are attached four identical L-shaped poles 90, 90', 100, and 100', hereinafter referred to for brevity as "L"s. Each L consists of an axial leg and a radial leg joined at an elbow at a right angle. L 90 consists of an axial leg 92 and a radial leg 94 meeting at an elbow 96. L 90' consists of an axial leg 92' and a radial leg 94' meeting at an elbow 96'. L 100 consists of an axial leg 102 and a radial leg 104 meeting at an elbow 106. L 100' consists of an axial leg 102' and a radial leg 104' meeting at an elbow 106'. The L's are connected to ring 88 at the ends of their radial legs opposite their elbows. Both the L's and ring 88 are made of magnetically interactive materials. An annular, toroidal stator winding 116 is rigidly attached to the inner perimeter of ring 88. An annular, toroidal inner winding 110, having two lateral sides 112 and 114, is rigidly attached to the inner surfaces of the L's. As shaft 80 rotates, bar 84 sweeps past lateral side 112 of inner winding 110 and bar 84' sweeps past lateral side 114 of inner winding 110 without contacting inner winding 110.

For a given current direction in stator winding 116, all the L's that face in one axial direction are N-poles, and all the L's that face the other axial direction are S-poles. In this way, each side of circumferential ring 88 is given heteropolarity (N-S-N-S). For example, if the elbows on one axial side are N-poles, then the ends of the axial legs on that side are S-poles, while the elbows on the other axial side are S-poles and the ends of the axial legs on the other axial side are N-poles.

To use the device of FIGS. 5 and 6 as a generator, DC current is supplied to stator winding 116 and shaft 80 is rotated. As bars 84 and 84' rotate, the magnetic field created by the DC current is made to vary periodically, inducing an AC EMF in inner winding 110. The magnetic flux in this device has two branches. Suppose for definiteness that the DC current in stator winding 116 flows into the plane of FIG. 5 at the top of FIG. 5 and out of the plane of FIG. 5 at the bottom of FIG. 5, i.e., clockwise in FIG. 6. In the orientation of bars 84 and 84' relative to the L's shown in FIGS. 5 and 6, magnetic flux of the first branch enters leg 94 from the top of ring 88, enters elbow 96 from leg 94, enters bar 84 from elbow 96 across the air gap therebetween, enters cylinder 82 from bar 84 (from left to right in FIG. 5), and enters bar 84' from cylinder 82. Magnetic flux of the second branch enters leg 94' from the bottom of ring 88, enters elbow 96' from leg 94', enters bar 84 from elbow 96' across the air gap therebetween, and joins the flux from the first branch in cylinder 82 from bar 84 and bar 84' from cylinder 82. The magnetic flux then splits again into two branches. The first branch enters elbow 106 from bar 84' across the air gap therebetween, enters leg 104 from elbow 106, and returns to ring 88 from leg 104. The second branch enters elbow 106' from bar 84' across the air gap therebetween, enters leg 104' from elbow 106', and returns to ring 88 from leg 104', where it joins the first branch. In short, in the orientation of FIGS. 5 and 6, bars 84 and 84' are linked by magnetic flux to the elbows of the L's. After the rotor is rotated by 90°, the ends of bar 84 are next to axial legs 102 and 102', and the ends of bar 84' are next to axial legs 92 and 92'. One branch of the magnetic flux enters leg 94 from the top of ring 88, enters elbow 96 from leg 94, enters leg 92 from elbow 96, enters bar 84' from leg 92, enters cylinder 82 from bar 84' (from right to left in FIG. 5), and enters one side of bar 84 from cylinder 82. The second branch of magnetic flux also enters leg 94' from the bottom of ring 88, enters elbow 96' from leg 94', enters leg 92' from elbow 96', enters bar 84' from leg 92', joins the first branch in cylinder 82 from bar 84' and separates from the first branch into the other side of bar 84 from cylinder 82. The first branch of the magnetic flux then enters leg 102 from bar 84, enters elbow 106 from leg 102, enters leg 104 from elbow 106, and returns to ring 88 from leg 104. The second branch of the magnetic flux enters leg 102' from bar 84, enters elbow 106' from leg 102', enters leg 104' from elbow 106', and joins the first branch in ring 88 from leg 104'. In short, when the rotor is rotated by 90° with respect to the orientation of FIGS. 5 and 6, bars 84 and 84' are linked by magnetic flux to the axial legs of the L's. Thus, when the rotor is in the position shown in FIG. 5, the magnetic flux patterns above and below shaft 80 look like "O"s, and the magnetic field through inner winding 110 points to the right; whereas when the rotor is in the perpendicular position, with bar 84 horizontal and bar 84' vertical, the magnetic flux patterns above and below shaft 80 look like figure "8"s, and the magnetic field through inner winding 110 points to the left.

It will be appreciated that the design illustrated in FIGS. 5 and 6 is not inherently limited to two bars and four L-shaped poles. Any reasonable number of radially projecting poles can be rigidly attached at equal angular spacings around opposite sides of shaft 80 (including, in principle, one pole on each side, although such a design would be mechanically imbalanced), with the poles on one side interleaved with the poles on the other side when the machine is viewed end-on as in FIG. 6. (Bars 84 and 84' in the specific embodiment illustrated in FIGS. 5 and 6 are the equivalents of two poles at either side of shaft 80.) Around the two sides of the stator are attached as many L-shaped poles as there are radially projecting poles, also at equal angular spacings, and also mutually interleaved when the machine is viewed end-on.

It also will be appreciated that three units of the second embodiment can be connected in tandem to form a three-phase generator, and that two or more units can be connected, as in the first embodiment, to form an electric motor.

Figure 7B:
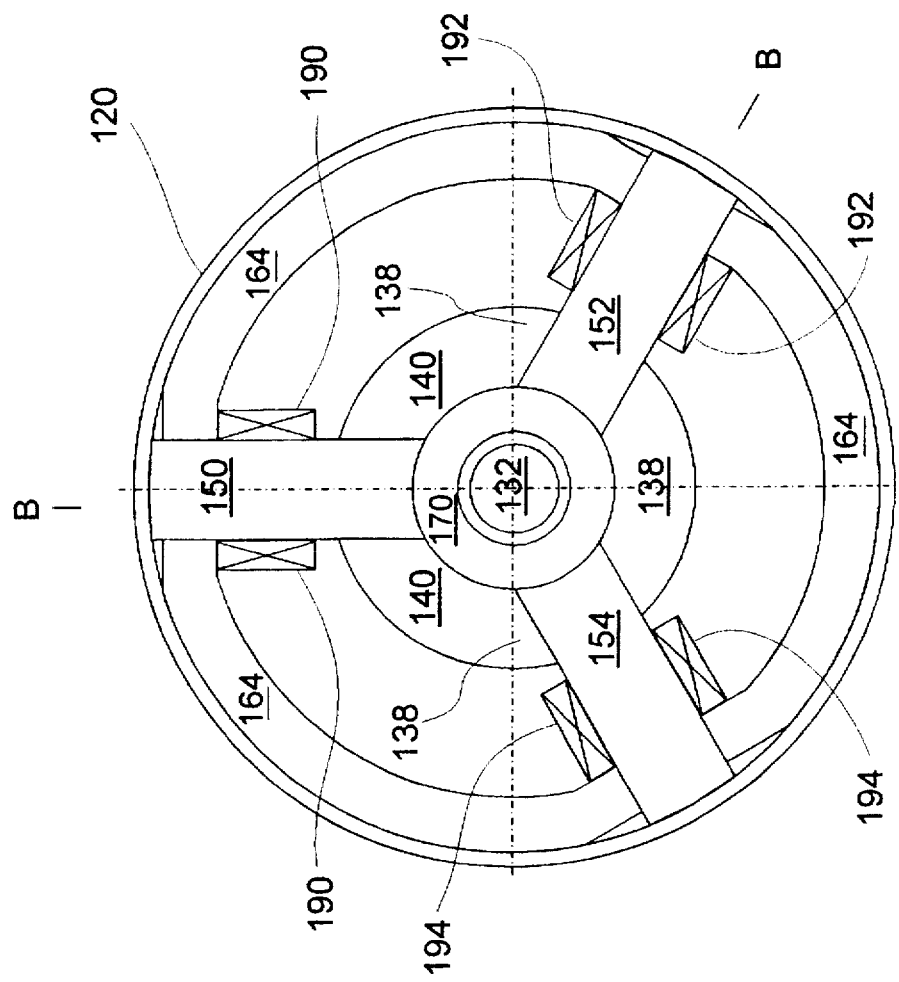
FIG. 7B is a transverse cross-section through a third embodiment of the present invention.
Figure 7A:
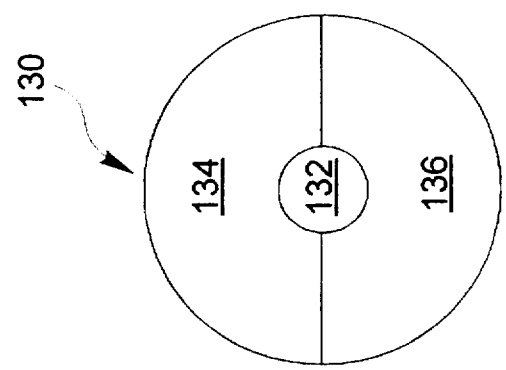
FIG. 7A is a transverse cross-section through a rotor of a third embodiment of the present invention.
Figure 8:
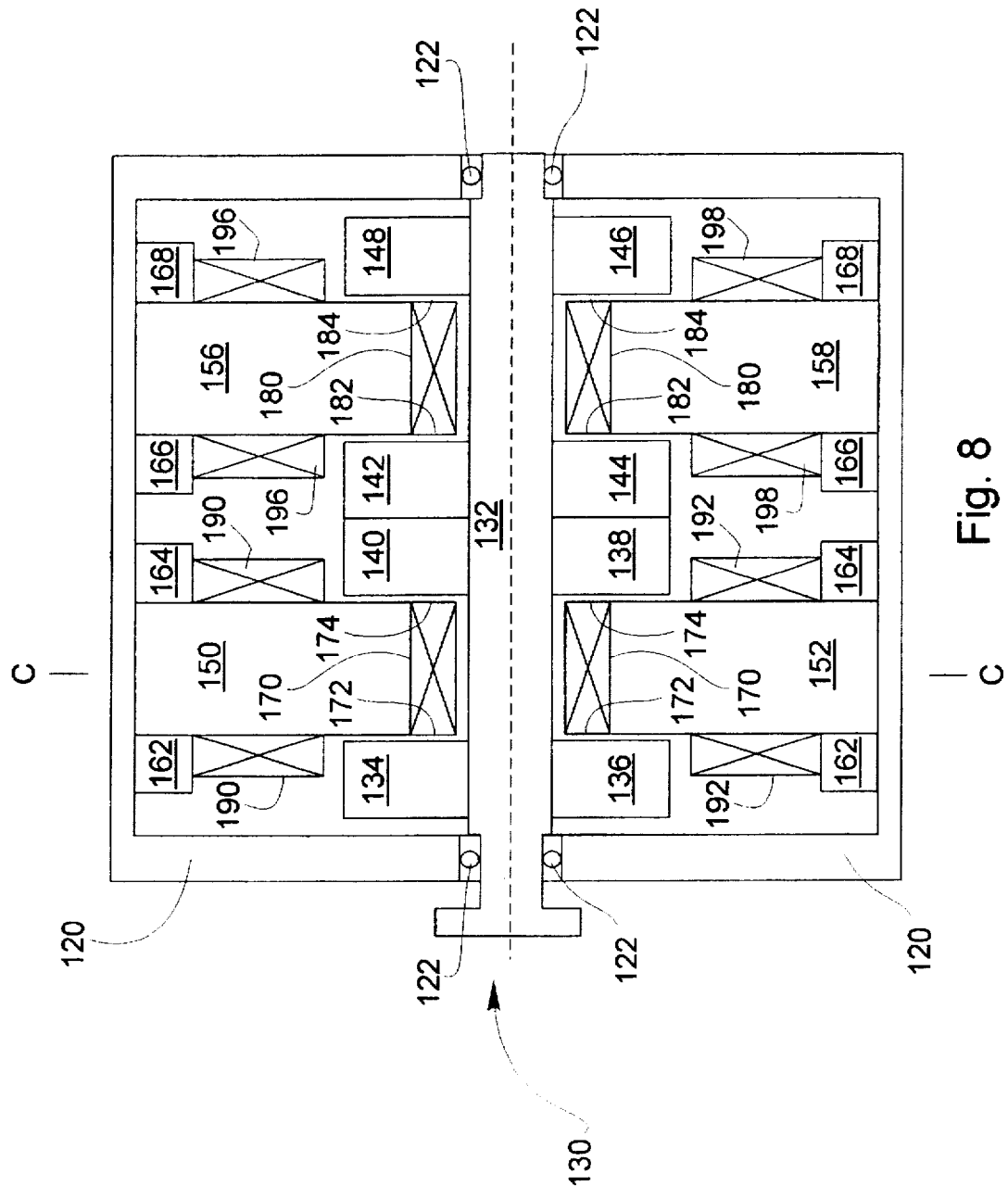
FIG. 8 is an axial cross-section through the embodiment of FIG. 7B.

FIGS. 7A, 7B and 8 show an example of a third embodiment of the present invention, suitable for use as a three-phase AC generator, a three-phase motor or a synchronous power factor compensator. FIG. 7A is a transverse cross section through the rotor 130 of this embodiment. FIG. 7B is a transverse cross section through the embodiment. FIG. 8 is an axial cross section through the embodiment. The cross section of FIG. 8 is along cut B—B of FIG. 7B. FIG. 7B actually is a composite of a cross-section along cut C—C of FIG. 8 and an end-on view of the embodiment looking from the left side of FIG. 8. This particular example has two units of a two pole machine. As is explained below, two pole machine units of this design preferably are configured in pairs, whereas units of this design having two or more pairs of poles may be used individually.

Rotor 130 of this embodiment consists of a shaft 132 to which are attached four annular disks. FIG. 7A is a transverse cross section through one of the disks, showing that it is made of a first half-disk 134, of a magnetically interactive material, and a second half-disk 136, of a magnetically noninteractive material having the same density as the material of half-disk 134. The magnetically interactive half-disks are half-disks 134, 138, 144 and 148. The magnetically noninteractive half-disks are half-disks 136, 140, 142 and 146. Note that the orientation of the magnetically interactive half of the disks alternates along shaft 132 within each of the two units of this embodiment, with the second disk from the left having its magnetically interactive half 138 on the opposite side of shaft 132 from magnetically interactive half 134 of the leftmost disk, and the rightmost disk having its magnetically interactive half 148 on the opposite side of shaft 132 from magnetically interactive half 144 of the second disk from the right. The magnetically noninteractive half-disks are optional. Their purpose is to provide mechanical balance, if needed: within each disk, the magnetically noninteractive half balances the magnetically active half against unbalanced centrifugal forces; and the left side of the rotor of FIG. 8 is the mirror image of the right side of the rotor of FIG. 8 to balance the forces between the disks and the stator described below.

Rotor 130 rotates freely within a housing 120, supported on bearings 122. The portion of rotor 130 that is within housing 120 is made of a magnetically interactive material. Rigidly attached to the inner surface of housing 120 are two stator armatures. The left stator armature includes three stator cores 150, 152 and 154, spaced 120° apart from each other as shown in FIG. 7B, and connected by two circumferential rings 162 and 164. The right stator armature similarly includes three stator cores, 156, 158 and a third stator core not shown, spaced 120° apart from each other, and connected by two circumferential rings 166 and 168. The stator cores and the circumferential rings are made of magnetically interactive materials.

Helically wound around the six stator cores are six stator windings. Stator winding 190 is wound around stator core 150. Stator winding 192 is wound around stator core 152. Stator winding 194 is wound around stator core 154. Stator winding 196 is wound around stator core 156. Stator winding 198 is wound around stator core 158. The sixth stator winding, like the sixth stator core, is not shown in the Figures. Rigidly attached to the radially inward ends of the stator cores are two stationary, annular, toroidal inner windings, surrounding shaft 132. Inner winding 170 is attached to poles 150, 152 and 154. Inner winding 180 is attached to poles 156 and 158, and to the sixth pole that is not shown in the Figures. As rotor 130 rotates, magnetically interactive half-disk 134 sweeps past lateral side 172 of inner winding 170, magnetically interactive half-disk 138 sweeps past lateral side 174 of inner winding 170, magnetically interactive half-disk 144 sweeps past lateral side 182 of rotor winding 180, and magnetically interactive half-disk 148 sweeps past lateral side 184 of rotor winding 180. FIG. 7B, in addition to being a transverse cross section through cut C—C of FIG. 8, also shows how circumferential ring 164 and half-disks 138 and 140 would appear behind the cut, as seen from the left in FIG. 8.

To use the device of FIGS. 7A, 7B and 8 as a generator, DC current is supplied to rotor windings 170 and 180 and rotor 130 is rotated. The magnetically interactive stator armatures divert the magnetic field created by the DC current through the stator windings. As the magnetically interactive half-disks sweep past the stator windings, the direction in which the magnetic field is directed through the stator cores changes periodically, inducing AC EMFs in the stator windings.

Suppose for definiteness that the DC current in rotor winding 170 flows into the plane of FIG. 8 above shaft 132 and out of the plane of FIG. 8 below shaft 132, i.e., counterclockwise in FIG. 7B. The magnetic flux through rotor winding 170 is always directed to the left in FIG. 8. With rotor 130 oriented relative to the stator armatures as shown in FIG. 8, magnetic flux enters the radially inward end of stator core 150 from half-disk 134 across the air gap therebetween, enters the tops of rings 162 and 164 from the radially outward end of stator core 150, enters the radially outward ends of stator cores 152 and 154 from rings 162 and 164, and enters half-disk 138 from the radially inward ends of stator cores 152 and 154 across the air gaps therebetween. The magnetic flux through stator winding 190 is directed radially outward, at its maximum value; the magnetic flux through each of stator windings 192 and 194 is directed radially inward, at half of its maximum value.

Now rotate rotor 130, as seen in FIG. 7B, clockwise by 120°. Half-disk 134 now is adjacent to stator core 152, and half-disk 138 is adjacent to stator cores 150 and 154. Therefore, the magnetic flux through stator winding 192 now is directed radially outward, at its maximum value, while the magnetic flux through each of stator windings 190 and 194 is directed radially inward, at half of its maximum value. Rotating rotor 130 clockwise by another 120° brings half-disk 134 adjacent to stator core 154 and half-disk 138 adjacent to stator cores 150 and 152. Now, the magnetic flux through stator winding 194 is directed radially outward, at its maximum value, and the magnetic flux through each of stator windings 190 and 192 is directed radially inward, at half of its maximum value. Thus, as rotor 132 is rotated at a uniform angular speed, AC EMFs are induced in stator windings 190, 192 and 194 that are identical except for being shifted in phase relative to each other by one-third of a cycle.

As noted above, the example illustrated in FIGS. 7A, 7B and 8 includes two units of a two pole machine. It will be appreciated that the design illustrated in FIGS. 7A, 7B and 8 is not inherently limited to two pole machines whose rotors include magnetically active half-disks. In general, the rotor projections of this embodiment have magnetically active lobes, spaced at equal angular increments. (The specific embodiment shown in FIGS. 7A, 7B and 8 has one semicircular lobe per disk.) Correspondingly, each stator armature of this embodiment includes three times as many stator cores as there are magnetically active lobes in one projection. Each unit of the embodiment includes one stator armature flanked by two rotor projections. Within each unit, the magnetically interactive lobes of one projection are interleaved with the magnetically interactive lobes of the other projection when the unit is viewed end-on. If each disk has two or more magnetically active lobes, then a machine of this embodiment needs only one unit, not the two units shown in FIG. 8, because the forces within each unit are balanced.

Figure 9:
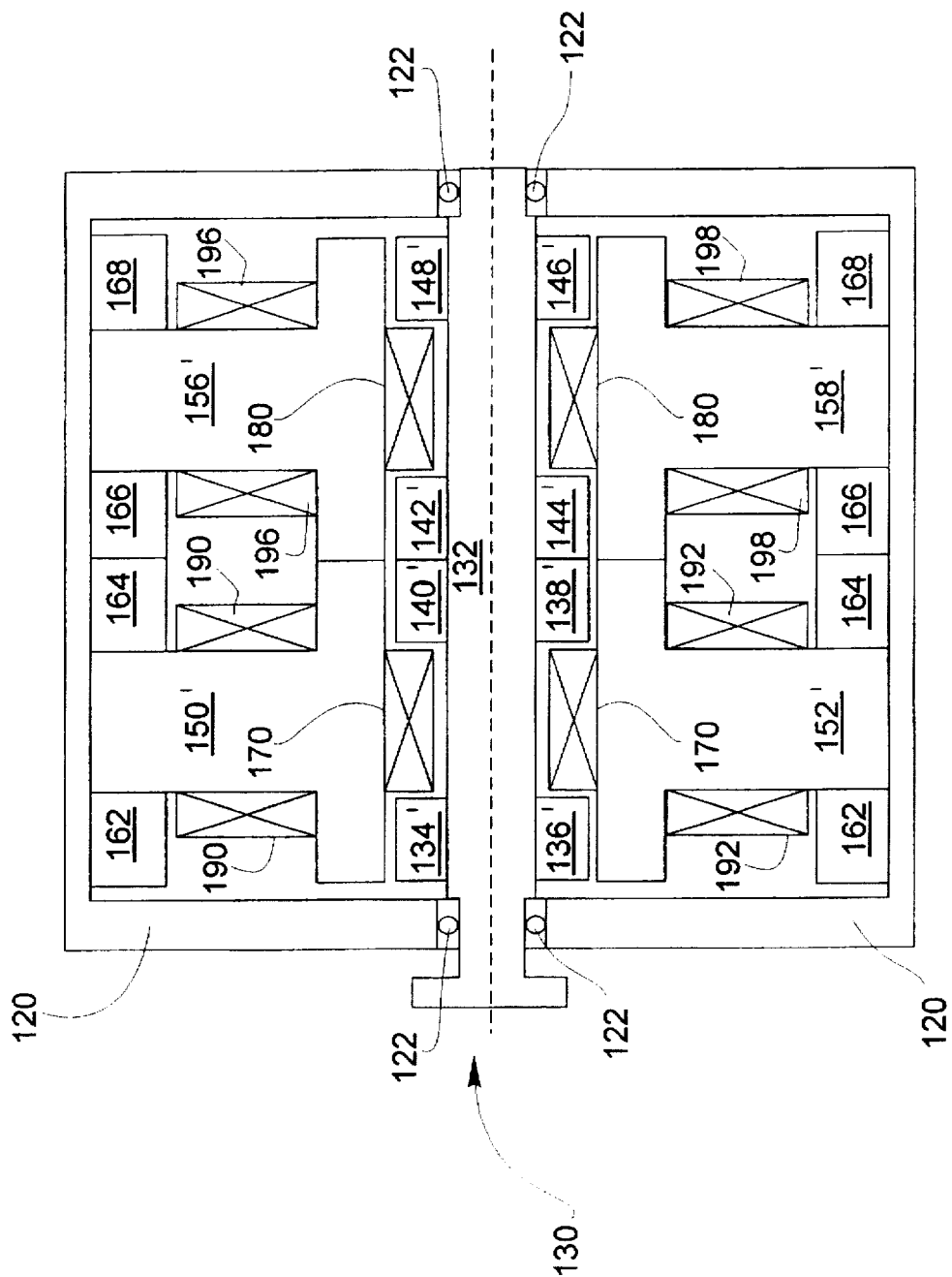
FIG. 9 is an axial cross-section through a variant of the embodiment of FIG. 7B.

FIG. 9 shows an axial cross-section through another variant of the two pole embodiment of FIGS. 7A, 7B and 8. In this variant, stator cores 150', 152', 156', 158' and two others not shown have a T-shaped cross section, and half-disks 134', 136', 138', 140', 142', 144', 146' and 148' are correspondingly smaller to accommodate the cross-bars of the T's. In this embodiment, the magnetic fluxes linking the stator cores and the half-disks are directed radially, as opposed to the embodiment of FIGS. 7A, 7B and 8, in which the magnetic fluxes linking the stator cores and the half-disks are directed axially. This variant is preferred in applications in which there is a limit on maximum rotor diameter.

Figure 10:
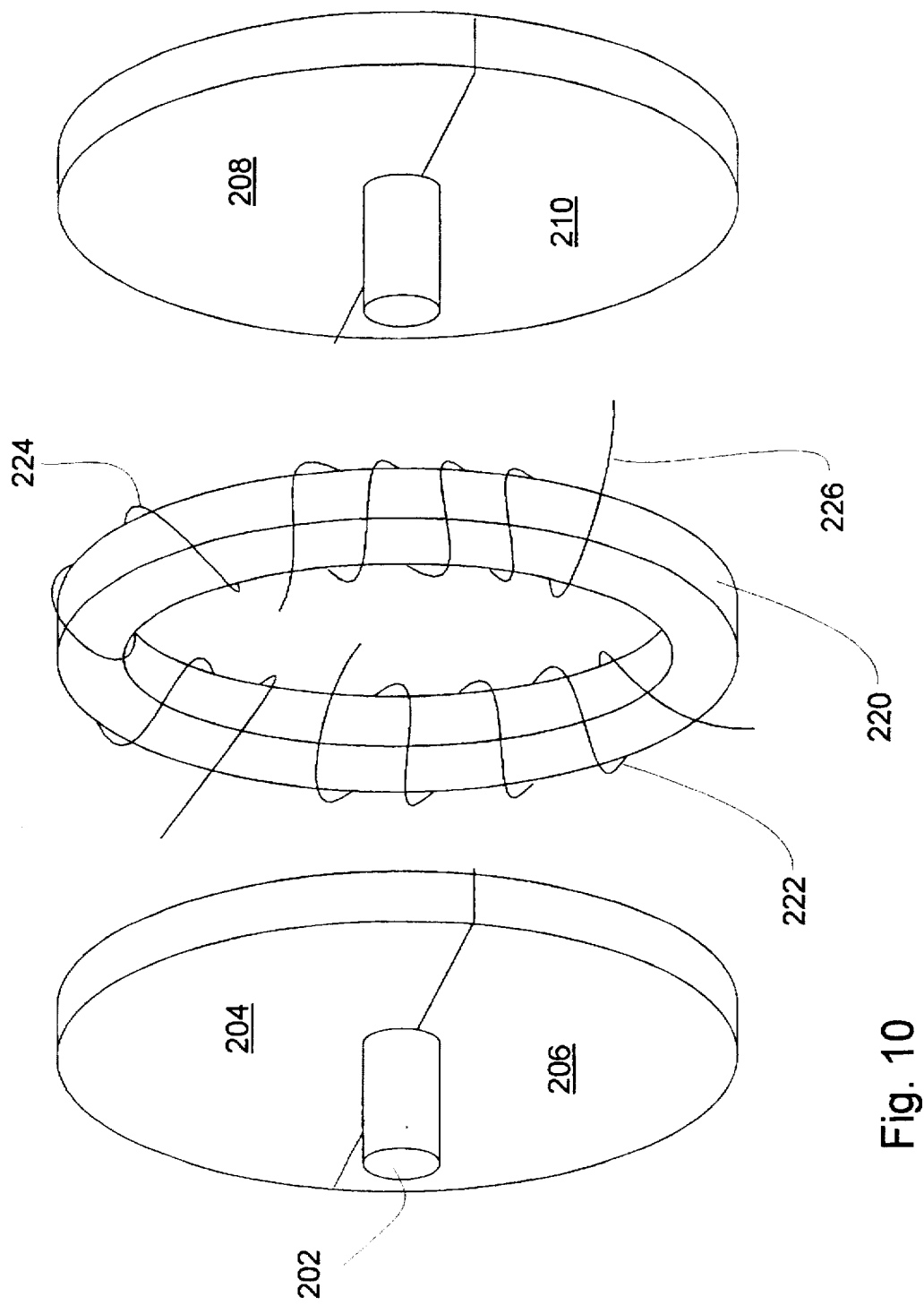
FIG. 10 is a partial exploded perspective view of a fourth embodiment of the present invention.

FIGS. 10 and 11 show one unit of a two pole version of a fourth embodiment of the present invention. FIG. 10 is a partial exploded perspective view. FIG. 11 is an axial cross section. The rotor of this embodiment is identical to the rotor of the third embodiment as illustrated in FIGS. 7A, 7B and 8: to a magnetically interactive shaft 202 are rigidly attached two annular disks, one disk including a magnetically interactive half-disk 204 and a magnetically noninteractive half-disk 206, and the other disk including a magnetically interactive half-disk 210 and a magnetically noninteractive half-disk 208. The stator armature of this embodiment is a circumferential ring 220 made of a magnetically interactive material. For example, ring 220 may be a steel strip bent in the shape of a circle as shown, a hexagon, or any other suitable closed figure. Three stator windings 222, 224 and 226 are wound poloidally around three different sections of ring 220. Preferably, each section occupies an azimuthal span of 120° around ring 220. Shaft 202 is mounted on bearings 232 in a housing 230. Stator windings 222, 224 and 226, as well as ring 220, are attached to housing 230 as shown. A stationary inner winding 240, substantially identical to the inner winding of the third embodiment, is attached to stator windings 222, 224 and 226 as shown. For clarity, housing 230, bearings 232 and inner winding 240 are not shown in FIG. 10; and only cross sections of stator windings 222 and 224 are shown in FIG. 11.

With an appropriately directed magnetic field in the inner winding, and with the disks positioned as shown in FIG. 10, magnetic flux enters the top half of ring 220 from half-disk 204, and enters half-disk 210 from the bottom half of ring 220. Within ring 220, magnetic flux points in a clockwise direction on the right side of ring 220 and in a counterclockwise direction on the left side of ring 220. As shaft 202 is rotated, this pattern of magnetic flux rotates along with shaft 220, inducing a three-phase AC EMF in windings 222, 224 and 226.

As in the case of the third embodiment, the most general form of the rotor projections of the fourth embodiment includes magnetically active lobes spaced at equal angular increments. Within each unit of the embodiment, the magnetically interactive lobes of one projection are interleaved with the magnetically interactive lobes of the other projection when the unit is viewed end-on. There are three times as many stator windings as there are lobes per projection, each stator winding occupying an equal azimuthal portion of ring 220. Also as in the case of the third embodiment, only the two pole embodiment needs to be configured as two tandem units, for mechanical balance; units with three or more poles may be used individually.

To configure the fourth embodiment of the present invention as a motor, the stator windings are supplied with AC current, and the inner winding of each unit is supplied with a DC current. The interaction between the static magnetic fields of the inner windings and the time-varying magnetic fields of the stator windings provides a torque that turns the rotors. Because the lobes on either end of each unit interleave, there always is a net torque on the rotors.

While the invention has been described with respect to a limited number of embodiments, it will be appreciated that many variations, modifications and other applications of the invention may be made.

What is claimed is:

1. An electrical machine comprising:
   (a) a stator armature including a number of magnetically interactive axial bars;
   (b) a substantially toroidal annular winding, rigidly attached to said stator armature and having two lateral sides;
   (c) a rotor including:
      (i) a shaft concentric with and extending axially through said annular winding and free to rotate therewithin, and
      (ii) a magnetically interactive rotor member, rigidly attached to said shaft, and including two projections extending radially outward from said shaft, each of said projections sweeping past said axial bars and past at least a portion of one of said lateral sides of said winding as said shaft rotates.

2. The electrical machine of claim 1, wherein each of said projections includes a number of substantially identical rotor teeth projecting radially outward from a substantially circular perimeter.

3. The electrical machine of claim 2, wherein said number of axial bars is equal to said number of rotor teeth.

4. An electrical machine comprising:
(a) a stator armature, including two sets of magnetically active L-shaped poles, each of said L-shaped poles having a radial leg and an axial leg meeting at an elbow, said radial leg extending radially outward from said elbow, said axial leg extending axially from said elbow, said L-shaped poles of a first of said two sets being positioned azimuthally around said armature at substantially equal angular spacings, said L-shaped poles of a second of said two sets, equal in number to said L-shaped poles of said first set, also being positioned azimuthally around said armature at said substantially equal angular spacings, interleaved azimuthally with said L-shaped poles of said first set, with said axial legs of said L-shaped poles of said first set pointing axially opposite to said axial legs of said L-shaped poles of said second set;
(b) a substantially toroidal annular winding, rigidly attached to said stator armature and having two lateral sides; and
(c) a rotor including:
  (i) a shaft concentric with and extending axially through said annular winding and free to rotate therewithin, and
  (ii) a magnetically interactive rotor member, rigidly attached to said shaft, and including two projections extending radially outward from said shaft, each of said projections sweeping past at least a portion of one of said lateral sides of said winding as said shaft rotates.

5. The electrical machine of claim 4, wherein said elbows of said L-shaped poles of said first set are substantially axially adjacent to a first of said lateral sides of said winding, and wherein said elbows of said L-shaped poles of said second set are substantially axially adjacent to a second of said lateral sides of said winding.

6. The electrical machine of claim 4, wherein a first of said two projections includes rotor poles, equal in number to said L-shaped poles of said first set, extending radially outward from said shaft and positioned azimuthally around said shaft at said substantially equal angular spacings, and wherein a second of said projections includes a like number of rotor poles, substantially identical to said rotor poles of said first projection, extending radially outward from said shaft, positioned azimuthally around said shaft at said substantially equal angular spacings and interleaved with said rotor poles of said first projection.

7. The electrical machine of claim 4, wherein said stator armature further includes a magnetically interactive ring, substantially surrounding said winding, and connected to said radial legs of said L-shaped poles.

8. An electrical machine comprising:
(a) a stator armature including a number of magnetically interactive stator cores;
(b) a substantially toroidal annular inner winding, rigidly attached to said stator armature and having two lateral sides, each of said stator cores extending radially outward from said inner winding, said stator cores being positioned azimuthally around said inner winding at substantially equal angular separations; and
(c) a rotor including:
  (i) a shaft concentric with and extending axially through said inner winding and free to rotate therewithin, and
  (ii) a magnetically interactive rotor member, rigidly attached to said shaft, and including two projections extending radially outward from said shaft, each of said projections sweeping past at least a portion of one of said lateral sides of said winding as said shaft rotates.

9. The electrical machine of claim 8, further comprising:
(d) stator windings, equal in number to said stator cores, each of said stator windings being wound toroidally around one of said stator cores.

10. The electrical machine of claim 8, wherein each of said first projection and said second projection includes at least one lobe, said first projection and said second projection having a like number of lobes, said lobes of said second projection being interleaved angularly with said lobes of said first projection.

11. The electrical machine of claim 10, wherein said number of lobes of each of said projections is equal to one-third of said number of stator cores.

12. The electrical machine of claim 9, wherein a first of said projections includes a certain number of lobes and a second of said projections includes a like number of said lobes, said lobes of said second projection being interleaved angularly with said lobes of said first projection.

13. The electrical machine of claim 12, wherein said number of lobes of each of said projections is equal to one-third of said number of stator cores.

14. An electrical machine comprising:
(a) a stator armature including a magnetically interactive ring;
(b) a substantially toroidal annular inner winding, rigidly attached to said stator armature substantially concentrically with said ring and having two lateral sides;
(c) a rotor including:
  (i) a shaft concentric with and extending axially through said inner winding and free to rotate therewithin, and
  (ii) a magnetically interactive rotor member, rigidly attached to said shaft, and including two projections extending radially outward from said shaft, each of said projections sweeping past at least a portion of one of said lateral sides of said winding and past at least a portion of said ring as said shaft rotates; and
(d) at least one stator winding, wound poloidally around said ring.

15. The electrical machine of claim 14, wherein said projections have azimuthally varying shapes, such that a first of said projections and a second of said projections extend radially outward from said shaft in a substantially opposite manner.

16. The electrical machine of claim 15, wherein each of said first projection and said second projection includes at least one lobe, said first projection and said second projection having a like number of lobes, said lobes of said second projection being interleaved angularly with said lobes of said first projection.

17. The electrical machine of claim 16, wherein there are three times as many of said at least one stator windings as there are said lobes in each of said projections.

18. The electrical machine of claim 16, wherein there are as many of said at least one stator windings as there are said lobes in each of said projections.

19. The electrical machine of claim 14, wherein a first of said projections includes a certain number of lobes and a second of said projections includes a like number of said lobes, said lobes of said second projection being interleaved angularly with said lobes of said first projection.

20. The electrical machine of claim 19, wherein there are three times as many of said at least one stator windings as there are said lobes in each of said projections.

21. The electrical machine of claim 19, wherein there are as many of said at least one stator windings as there are said lobes in each of said projections.

22. An electrical machine comprising:

(a) a stator armature;

(b) a substantially toroidal annular inner winding, rigidly attached to said stator armature, and having two lateral sides; and (c) a rotor including:

(i) a shaft concentric with and extending axially through said inner winding and free to rotate therewithin, and (ii) a magnetically interactive rotor member, rigidly attached to said shaft, and including two projections extending radially outward from said shaft, each of said projections sweeping past at least a portion of one of said lateral sides of said winding as said shaft rotates, at least one of said projections including a plurality of substantially parallel sheets of a magnetically interactive material separated by at least one insulating material.

23. The electrical machine of claim 22, wherein said rotor further includes:

(iii) a securing member, rigidly attached to said shaft and having at least one slot extending radially from said shaft, said at least one slot being at least partly occupied by at least one of said at least one projection that includes said plurality of substantially parallel sheets.

* * * * *